Patented Dec. 22, 1942

2,305,620

UNITED STATES PATENT OFFICE 2,305,620

FLAVORED FOODS

Roland E. Kremers, Summit, N. J., assignor to General Foods Corporation, New York, N. Y., a corporation of Delaware No Drawing. Application August 3, 1939, Serial No. 288,227

17 Claims. (Cl. 99—140)

This invention pertains to the preservation of aromatic or flavor compounds, particularly in food products, so as to protect such products against loss or deterioration of flavor or aroma during the period between manufacture and actual use thereof, and is a continuation in part of my application Serial No. 136,667, filed April 13, 1937.

It is well known that the aroma and flavor of many articles of food are their most valued characteristics and are essential to their successful merchandising. This importance has led to the concentration and study of aroma and flavor bearing substances, the concentrated flavor and aroma bearing volatile oils of fruits or other food materials being manifest products of such efforts. With the concentration of aromas and flavors it has been possible to add attractive and appealing characteristics to otherwise odorless or flavorless materials.

With the advent of goods in package form, many articles were reduced to a sensibly dry condition for convenience and stability during merchandising, and the above mentioned aroma and flavor concentrates have been incorporated into such dry products in various ways known to the art and often by the simple expedient of thorough mixing. Unfortunately such products often deteriorate rapidly during their "shelf-life" and lose their appeal because of the instability of the flavor and aroma bearing chemical constitutents in spite of the greatest care in the design, materials and sealing of the packages. To overcome this difficulty it has sometimes been proposed to add synthetic substances which have a more powerful aroma or flavor, such addition of synthetics being commonly referred to as a "fortification" of the weaker natural flavors and aromas. Although the strength of such synthetic chemicals is often very great, they do not have, except in special instances, markedly greater resistance to deterioration than the natural concentrates. What they add in intensity is often offset by their very great volatility.

It is well known that these flavor and aroma losses even of fortified products have led to many efforts to prevent such losses by mechanical means. For instance, efforts have been made to occlude the flavors in agglomerations or granules of bulkier ingredients of the mixtures, or to retard evaporation by dissolving the flavor in high boiling substances. However, all such attempts have at best only slightly retarded the loss of flavor and aroma. It is characteristic of all these previous efforts to preserve flavor and aroma that an aggregate of flavor bearing materials has been subjected as an entirety to the same mechanical or physical manipulation without regard to the stability or instability of the individual constituents of the aggregate. Hermetical sealing of materials in the absence of atmospheric oxygen accomplishes the desired end for some commodities, but it introduces an unwarranted manufacturing cost and provides no protection after the seal has once been broken.

In contrast to this prior art, it is a characteristic of the present invention that the preservation of flavor and aroma of food products of the type described above is accomplished through chemical manipulations based on and adapted to the specific reactivities of individual chemical constituents of the flavor and aroma bearing volatile oils.

The aroma and flavor bearing substances of fruits and other food materials are found principally in the volatile oils and investigation and study of these oils have shown that the most important flavor and aroma bearing constituents of these oils are aldehydes, alcohols, ketones, esters, phenols, and lactones. Broadly speaking the deterioration of flavor and aroma in food products containing added volatile oils is due to changes in these constituents caused by two general processes. The first process is that of volatilization, whereby the flavor or aroma bearing substances evaporate more or less rapidly due to their measurable vapor pressure. The second process is that of oxidation. Such substances may be unstable to atmospheric oxygen in a variety of ways. They may be oxidized to other compounds, or they may undergo resinification or polymerization as a result of the more or less catalytic effect of lesser quantities of oxygen. An accessory factor which tends to accelerate these deteriorating effects of evaporation and oxidation is the common practice of spreading the added volatile oil over the surface of the dry ingredients which constitute the bulk of the food. The rate of flavor loss is a more or less individual characteristic of each volatile oil constituent. In an acidulated gelatine dessert powder, for example, the flavor and aroma of benzaldehyde and citral vanish or deteriorate materially in two weeks or less, whereas certain other constituents such as decanal are more persistent. Nevertheless in virtually every case a distinct change of aroma or flavor occurs, leading to a deteriorated product. Protection both against evaporation and against atmospheric oxygen is therefore essential to overcome the deterioration and to avoid the wasteful and uneconomical practice of adding excessive quantities of flavor materials to allow for loss.

One of the objects of the present invention is to prevent deterioration of the aroma and flavor of food products of the type characterized above by utilizing the chemical affinities of the aroma and flavor bearing substances to form compounds of sufficient stability against volatilization and oxidation substantially to withstand change during the shelf-life of the product, both in the store and in the home, but of such nature as to release the desired aroma or flavor during the preparation or use of the product.

Another object is to provide a method of imparting flavor or aroma to a food product wherein flavor or aroma is released or regenerated in nascent state from chemical combinations with another substance during the preparation of the food for consumption.

Another object is to provide a packaged food product having improved flavor and aroma characteristics at the time of use or consumption due to the prevention of deterioration and the release of fresh flavor therein.

A further object is to provide a food product containing an aroma or flavor bearing substance chemically combined with an edible but substantially odorless and tasteless substance to form a reaction product that is substantially unaffected by oxidation and substantially non-volatile so that said product can be packaged and stored in ordinary paper or other suitable packages without material deterioration of aroma or flavor.

Another object is to prevent the evaporation or oxidation of individual constituents of volatile oils added to food products of the type characterized above by the prior conversion of such constituents into definite, preferably solid chemical derivatives.

A still further object is to minimize change in the added reaction products during storage by using preferably solid derivatives whereby contact with other ingredients and exposure to atmospheric conditions is greatly reduced.

To the above ends one or more aroma or flavor bearing substances that are desired for a given food product, and particularly those chemical constituents which are characteristically present in natural volatile oils having the desired flavor and aroma, are first chemically combined with suitable reagents to form reaction products that are stable, substantially non-volatile, and substantially non-oxidizable as compared with the uncombined substances. Such reaction products are therefore vehicles whereby flavor and aroma bearing substances can be added to food products which can then be kept or stored substantially indefinitely, or packaged in ordinary paper or other suitable cartons and kept on the shelf without material change in or loss of said substances for periods that are relatively long as compared with similar products as now marketed. If then the reaction product is such that the conditions of preparation or use of the food bring about the breaking up or decomposition of the reaction product, the original flavor or aroma bearing substance may be liberated or regenerated in the food without having undergone deterioration during the period between manufacture and use.

The flavor and aroma bearing constituents of the natural volatile oils can be classified on a functional basis in terms of their characteristic atomic or functional groups, such as the hydroxyl ($-OH$) group in the case of the alcohols and phenols, the carbonyl ($C=O$) group in the case of aldehydes and ketones, etc. A reaction which involves a functional group of a compound and does not otherwise alter its molecular structure is a functional reaction and the resultant reaction product is a functional derivative of the original compound. Because functional derivatives can often be resolved into the original reactants by reversing the reaction which united them, such derivatives are a preferred type of reaction product for purposes of the present invention.

Further with particular substances it is possible to employ any one of a number of suitable reagents provided the reaction products are stable against deterioration and have no deleterious effect on the flavor and aroma bearing substances or on the food products. Since as indicated above any change in the chemical make-up of the flavor or aroma bearing substances may lead to an undesirable change or loss of flavor and aroma, the chemical reaction is preferably such that under the conditions of preparation or use the original aroma or flavor bearing substance may be liberated or made available in its original or unchanged form. Further the reagents used should be acceptable as ingredients of foodstuffs whenever the product is intended for human consumption, and should be compatible with the food in the sense that they do not of themselves contribute any objectionable aroma or flavor; if they are not odorless or tasteless they should have characteristics which are desirable or at least not objectionable in the food in which they are used. The term "compatible" will be understood to have this meaning throughout this specification and the appended claims.

The reaction product must also be unstable under the conditions of ultimate preparation or use of the food. The factors which may bring about the regeneration of the original aroma and flavor bearing substance will vary according to the manner of preparing or using the food and include: the mass action of water; the catalytic effect of acids, for instance fruit acids; the conditions obtaining in the mouth; elevated temperatures, for instance the temperature of hot or boiling water; or other operations employed in the preparation, consumption, or use of the food. Any reagent may be employed which complies with the foregoing requirements and provides a reaction product that is substantially non-volatile, as compared with the original substance, and substantially stable to the ordinary conditions of temperature and atmosphere encountered in the marketing of the particular food in which it is incorporated. Accordingly the normal composition, the normal stage conditions and the normal methods of preparation of any given food product of the type concerned constitute conditions which determine the degree of stability and reversibility demanded of each chemical derivative of a volatile oil constituent to be added to said food product and are in effect the specifications of the requisite properties of these chemical derivatives.

The invention is applicable to a wide variety of food products such as cereals, dessert preparations, jelly mixtures, beverage substances and extracts, chickle, etc. The well-kown flavored and sweetened dessert mixtures, for example, gelatin desserts, pudding powders, ice cream mixes, etc., furnish convenient illustrations of the application of the invention. Hermetical sealing of such mixtures is not economically practicable and they are commonly packaged in paper containers which may remain on the shelf for substantial periods before they are sold and for further substantial periods in the home before they are actually used. The volatile and oxidizable constituents of the natural volatile oils found in concentrated flavoring extracts derived from fruits and other foods deteriorate rapidly under these conditions. By adding a flavor bearing substance combined with a reagent as specified above, so that the flavor bearing substance does not deteriorate, it is possible to regenerate or release the flavor in its original form and intensity when the dessert is prepared for consumption. In effect fresh flavor is added at the time of preparation or use regardless of the time that has elapsed since the manufacture of the product.

Under the functional classification referred to above, chemical constituents of volatile oils characterized by a carbonyl or hydroxyl group form two important classes of flavor and aroma bearing compounds. Functional derivatives of compounds of these classes can be formed according to the present invention by various reactions, among which may be mentioned reactions with direct or indirect elimination of water involving carbonyl and amine groups, carbonyl and hydroxyl groups, and hydroxyl and carboxyl groups, depending on the functional group present in the particular flavor and aroma bearing constituent involved.

The following examples illustrate functional derivatives formed by various reactions involving carbonyl and amine groups. As will be evident from these examples, the flavor and aroma bearing constituent may provide either the carbonyl or the amine group for the reaction or both reactants may be flavor and aroma bearing, in which case both will be protected against deterioration and will be regenerated under conditions of use. Moreover, it is apparent that whichever group is provided by the flavor and aroma bearing constituent, the reactant supplying the other group may be selected from a wide variety of suitable substances.

Carbonyl-amine group reactions

*Benzal-di(ethyl carbamate).*—M. P. 181–182° C. This compound may readily be made by adding 53 grams of pure benzaldehyde to 89 grams of ethyl carbamate dissolved in 165 grams of dichlorethane. To this solution, warmed on a water bath, 12 drops of concentrated hydrochloric acid are added to catalyse the condensation; the mixture then is allowed to cool. After ½ hour 132 cc. of hexane are added and crystallization is completed by storage at 5° C. The crystalline product is collected by suction filtration, washed with hexane and recrystallized from 3 parts of dichlorethane.

Benzaldehyde has been used extensively in the preparation of cherry flavors, which have often been labeled "cherry pit" flavors. However, benzaldehyde is notorious for its speed of oxidation when exposed to air, and if used in dessert mixtures of the type commonly merchandized in paper containers, its flavor and aroma are lost in less than a week's time of ordinary storage by reason of its oxidation to benzoic acid. The di(ethyl carbamate) derivative of benzaldehyde on the other hand is an odorless, crystalline, stable solid which does not deteriorate and which in the presence of a weak acid and warm water will liberate benzaldehyde. In the case of its addition to a dessert of the character mentioned, for example, the benzaldehyde is therefore in effect added in a fresh and unaltered condition during the preparation of the product for the table. Its desired contribution to the aroma and flavor of the finished dessert is at a maximum both as to intensity and quality, whereas the effect of the regenerated ethyl carbamate is negligible, or at most a slight bitter effect which is entirely compatible with a dessert containing much sugar.

*Ethanal-di(ethyl carbamate).*—M. P. 125° C. This compound may be prepared by condensing a cooled mixture of acetaldehyde and ethyl carbamate in the presence of a trace of concentrated hydrochloric acid. It is purified by recrystallization from water. The occurrence of ethanal in the cohobated aqueous distillates of numerous volatile oils indicates its usefulness in imparting "top" odors and freshness to food products, although heretofore the use of ethanal as such has been impractical because of its great volatility and reactivity.

*iso-Pentanal-di(ethyl carbamate).*—M. P. 129° C. This compound may be prepared by condensing isovaleric aldehyde and ethyl carbamate with a small amount of concentrated hydrochloric acid. Purification is accomplished by recrystallization from an alcohol-water solution. It may be used in traces to impart freshness as well as its own characteristic effects. The free aldehyde is seldom used because of its ready oxidation to the irritating isovaleric acid.

*Heptanal-di(ethyl carbamate).*—M. P. 116°–117° C. This compound is preferably prepared through the direct condensation of its constituents by a trace of concentrated hydrochloric acid; recrystallization to odor purity is effected from a mixture of ethanol and hexane. It may be used in traces for its qualities of freshness and fruitiness. Previously the use of the unfixed aldehyde has been almost impossible because of its prompt oxidation to the objectionable heptoic acid.

*Octanal-di(ethyl carbamate).*—M. P. 114°–114.5° C. This compound is preferably prepared by condensing 8.34 grams of ethyl carbamate with 3 grams of octanal by a trace of concentrated hydrochloric acid. The product is first boiled with water to remove volatile impurities and then recrystallized to odor purity from a mixture of ethanol and water. This compound may be used to impart freshness and fruitiness in lemon and lime flavors, as indicated by its natural occurrence in lemon and neroli oils.

*Nonanal-di(ethyl carbamate).*—M. P. 112.5°–113° C. This compound is prepared like its next lower homolog, and is useful in imparting a sweet or flowery note to citrus and other flavors.

*Decanal-di(ethyl carbamate).*—M. P. 111.5°–112.5° C. This compound is prepared like the preceding two compounds, and may be used to impart a fresh and natural flavor to orange flavored products. Decanal is a natural constituent of oranges, but is very unstable.

Condensation products of higher aldehydes may be prepared in the manner described above and used for their characteristic flavor and aroma, as for example undecanal-di(ethyl carbamate), M. P. 109°–109.5° C. and duodecanal-di(ethyl carbamate), M. P. 108°–108.5°.

*Furfural-di-(ethyl carbamate)*.—M. P. 166–167° C. Appropriate quantities of redistilled furfural and ethyl carbamate are warmed together until solution is complete. The condensation is effected as usual by a drop of concentrated hydrochloric acid. The product is purified by recrystallization for dilute ethanol. Furfural is a characteristic constituent of many carbohydrate-containing products which have been subjected to heat, such as coffee and coffee substitutes. Furfural-di-(ethyl carbamate) is useful in preserving the aroma and flavor contributed by furfural to such products and may be incorporated with dried, water soluble extracts of such beverage materials. Since such extracts are acidic, pH about 5.0, the addition of hot water produces an acid solution which regenerates the furfural.

*Benzal-di(butyl carbamate)*.—M. P. 126.5–128° C. This compound may be prepared by condensing butyl carbamate with benzaldehyde in the manner described above for benzal-di(ethyl carbamate). The white crystalline product is purified by washing with hexane and water. In acid media, such as 2% tartaric acid, or in acidulated gelatin desserts this product liberates the aroma of benzaldehyde but not that of butyl alcohol.

*Benzal-diureide*.—M. P. 190° C. This compound is prepared by reacting 25 grams of benzaldehyde with 50 grams of urea in 50 cc. of water for 24 hours. Its excellent stability and its ready regeneration by weak acids at low temperatures make it very suitable for gelatin desserts prepared with warm water.

*Benzal-di(methylureide)*.—M. P. 180–181° C. This compound is prepared by dissolving 1.0 cc. benzaldehyde, 1.5 grams of methylurea, and 1 drop of concentrated hydrochloric acid in dry alcohol and refluxing for two hours. It is obtained as a white crystalline solid by evaporating the alcohol under reduced pressure and washing out the impurities with dilute ammonia and water. It is more stable than the preceding compound or benzal-di(ethyl carbamate) and may be used in food products which require brief boiling, such as pectin jellies.

*Ethanal-ureide*.—M. P. 173–175° C. This compound is prepared by mixing 5 grams of urea dissolved in 10 cc. of water with 4 cc. of 50% ethanal. After 16 to 20 hours, it is obtained as a white solid which is then pulverized, washed with water, and air dried. It is useful for imparting freshness to a variety of fruit flavors.

*Nonanal-ureide*.—M. P. 185–190° C. This compound is prepared by shaking 1 cc. of nonanal with 10 grams of urea dissolved in 5 cc. of warm water. Upon cooling, partial crystallization occurs after which the magma is thoroughly mixed and set aside. The product is then filtered and washed with water to remove excess urea and triturated with alcohol to remove unreacted nonanal. The compound is useful in conjunction with citrus oils.

*Decanal-ureide*.—M. P. 190–200° C. This compound is prepared like the preceding compound and is similarly useful in conjunction with citrus oils.

*Diacetyl-thioureide*.—M. P. 118–119° C. This compound is prepared by adding 135 grams of pulverized thiourea to 300 cc. of 95% ethanol containing 5 drops of concentrated hydrochloric acid and mechanically stirred. To the mixture are then slowly added 150 cc. of diacetyl and stirring continued until crystallization occurs. The compound is recovered by suction filtration, washed with 95% ethanol, washed twice with chloroform, once with ether, and then air dried and pulverized. It is primarily valuable for imparting butter or butterscotch flavors and is also useful in connection with dried extracts of roasted beverage materials and with certain fruit flavors, such as raspberry, orange, and strawberry.

*Diacetyl-di(ethanolamine)*.—M. P. 121–123° C. This compound is prepared by reacting 2.15 grams of diacetyl with 3.05 grams of ethanolamine. The crystalline product obtained is washed with alcohol and air dried. It is useful for producing the same flavors as the preceding compound, but is more sensitive to acids.

*Acetylmethylcarbinol - ethanolamine*.—M. P. 101–102° C. This compound is prepared by reacting 3 grams of acetylmethylcarbinol with 2.08 grams of ethanolamine. It is a crystalline, practically odorless substance which is very sensitive to acids and is useful in producing butter-like flavors.

*N-citrylidene-glucosamine*.—M. P. 139–140° C. This compound is prepared by adding 5 cc. of dry ethanol to a mixture of 2 cc. of citral and 1.06 grams of gulcosamine with slight heating and then filtering. After cooling, it separates as a white crystalline substance in the reaction mixture which is then diluted with an equal volume of dry ether and refrigerated for 3 hours, followed by filtration and washing with ether. It is only slightly soluble in water, but readily soluble in 2% tartaric acid and is useful in imparting the lemon-like flavor of citral.

*N-citrylidene-glucose ammonia*.—M. P. about 50° C. This compound is prepared by reacting citral and glucose ammonia in warm methanol. It is an amorphous, glassy substance useful in producing lemon-like flavors, but is more sensitive to acids than the preceding compound.

*N-cinnamylidene-anthranilic acid*.—M. P. 163–164° C. This compound may be prepared by warming anthranilic acid and cinnamic aldehyde in a toluene solution. It liberates cinnamic aldehyde in dilute acid and may be used under these conditions for its cinnamon flavor.

*N-citrylidene-p-amino-sodium benzoate*.—This compound may be prepared by condensing citral with an aqueous solution of sodium-p-amino-benzoate followed by filtration and careful drying. It is useful with lime or lemon flavors.

*N-citrylidene-sodium-glutamate*.—This compound may be prepared by condensing an aqueous solution of sodium glutamate with citral and a sufficient quantity of ethanol to make contact. The solvent is then evaporated and the product washed with hexane. This compound is useful with lime or lemon flavors.

*N-benzylidene-calcium-glycinate*.—This compound is prepared by shaking 10 cc. of benzaldehyde with a solution composed of 7.5 grams of glycine and 8.8 grams of crystalline calcium acetate dissolved in 40 cc. of water to which 10 cc. of concentrated ammonia have been added. The compound separates as a white crystalline substance and after 4 hours of refrigeration is collected on a filter and washed with water and ethanol. It is insoluble in cold water, but is slowly hydrolyzed by hot water and dilute citric acid to liberate benzaldehyde.

*N - cinnamylidene - calcium - glycinate*. — This compound is prepared by dissolving 2 grams of glycine and 1.0 gram of calcium hydroxide in 5 cc. of hot water and filtering to remove excess slaked lime. The filtrate is then shaken with 1.0 cc. of cinnamic aldehyde, and after 2 hours of refrigeration the compound separates out and is collected on a filter, washed with water, alcohol, and ether, and then dried. It liberates the cinnamon-like flavor of cinnamic aldehyde upon contact with dilute organic acids or saliva and is useful in the flavoring of chicle, gelatin desserts, and other mixtures.

*N-isopentylidene - calcium - glutamate.* — This compound is prepared by condensing rectified isovaleric aldehyde with a solution of calcium glutamate. The ready regeneration of the aldehyde gives particularly valuable results in conjunction with volatile sulphur compounds when added to dried extracts of roasted beverage materials.

*N - furfurylidene - calcium - glutamate.* — This compound is prepared in the same manner as the preceding one and is useful in similar applications.

*N-benzylidene-calcium-glutamate.*—This compound is prepared in a manner similar to that used in preparing the corresponding glycinate derivative. It also may be obtained directly from oil of bitter almonds. It is useful in producing cherry flavors in materials intended to be made up with warm water.

*N-cinnamylidene - calcium - glutamate.* — This compound is prepared either from isolated cinnamic aldehyde or from a volatile oil such as cassia oil. In the instance of the latter procedure, an aqueous solution of calcium glutamate is agitated with an alcoholic solution of cassia oil containing sufficient aldehyde to combine with the amino acid. The compound is isolated by separating the aldehyde derivative from the non-aldehyde constituents of the cassia oil or the reaction mixture may be directly incorporated into a sufficient quantity of anhydrous glucose or other suitable desiccant capable of taking up the extraneous liquids, water and alcohol. After the mixture becomes sensibly dry, it is comminuted and can be used very effectively to impart a cinnamon-like flavor to gelatin desserts and other products.

*N-citrylidene-calcium-glutamate.*—This compound is prepared under conditions similar to those described for the preparation of the preceding compound. It is a nearly colorless substance which is insoluble in water and on contact with dilute citric acid liberates citral. As in the two preceding cases, the procedure for producing this derivative of citral may be adapted to a variety of starting materials, including pure citral, terpeneless lemon oil, so-called lemon concentrates, and cold pressed lemon oil. The reaction product may be isolated and purified, or it may be further manipulated in contact with the non-aldehydic and unreacted portions of the starting material.

*Methyl-anthranilate-glucoside.*—M. P. 157–158° C. This substance is prepared by the condensation of equal parts of glucose and anthranilic-acid-methyl ester in 95% ethanol with acetic acid as catalyst. It is useful for the grape-like flavor which it liberates in contact with dilute acids.

*N-ethylidene-methyl-anthranilate.*—M. P. 125–126° C. This compound is prepared by condensing acetaldehyde and methyl anthranilate in an ether solution without a catalyst. It illustrates a reaction product involving methyl anthranilate which has a grape-like flavor and ethanol which is a common "top" component of some natural fruit flavors.

The following examples illustrate functional derivatives formed by reactions involving carbonyl and hydroxyl groups which, while within the scope of the present invention and broadly claimed herein, are specifically claimed in my companion application Serial No. 288,228. As will be evident from these examples, the flavor and aroma bearing constituent may provide either the carbonyl or the hydroxyl group or both reactants may be flavor and aroma bearing, in which case both will be protected and both will be regenerated. It will likewise be apparent that whichever group is provided by the flavor and aroma bearing constituent, the reactant supplying the other group may be selected from a variety of suitable substances.

Carbonyl-hydroxyl group reactions

*Benzal-α-methyl glucoside.*—M. P. 166–167° C. This substance results from the interaction of benzaldehyde and α-methyl glucoside with the loss of 1 molecule of water. It is resolved again into its original components by solution in warm, dilute acids, thereby releasing the characteristic cherry flavor.

*Diacetone-glucose.*—M. P. 107° C. This compound is prepared by condensing its components in the presence of copper sulphate and concentrated sulphuric acid. It is useful in desserts to modify "top" aromas, as well as in dry beverage extracts to replace aromatic constituents lost during dessication.

*Geranyl hemi-acetal of penta-acetyl-aldehydogalactose.*—M. P. 91–92° C. This compound is prepared by dissolving 1 gram of aldehydo-d-galactose-penta-acetate in 4 cc. of geraniol warmed on a hotplate. The solution is chilled in ice, diluted with 4 cc. of alcohol-free ether and 4 cc. of hexane, and kept overnight at 5° C. The crystalline hemi-acetal is collected on a Hirsch funnel, washed with ether and hexane, and recrystallized from geraniol. It is useful in citrus flavors.

*Citronellyl hemi-acetal of penta-acetyl-aldehydogalactose.*—M. P. 102–103° C. This product is prepared by the union of its components and purified by the technic described for the preceding compound and like it is useful in citrus flavors.

*Phenylethyl hemi-acetal of penta-acetyl-aldehydogalactose.*—M. P. 103–104° C. This substance is prepared from its components and can be used in citrus flavors like the two preceding compounds.

*Menthyl hemi-acetal of penta-acetyl-aldehydogalactose.*—M. P. 89–91° C. This compound is prepared by condensing the reactants dissolved in dry benzene with a trace of dry hydrogen chloride as catalyst. The reaction is stopped at the hemi-acetal stage by washing out the acid. It is useful in mint flavored products and for imparting the cooling sensation of menthol.

*Phenylethyl hemi-ketal of dimethylalloxan.*—M. P. 100–102° C. This substance is prepared by combining phenylethyl alcohol with dimethylalloxan in dry acetone. It is recovered by evaporation of the solvent and is useful in fruit flavored products, liberating its flavor upon addition of warm water.

*Decanol hemi-acetal of decanal.*—M. P. 31° C. This product is prepared by reacting equi-molecular quantities of decanol and decanal to form the hemi-acetal, and may be recrystallized from ethanol. It is dissociated by warm water and is valuable for introducing "freshness" into citrus flavored products.

*Methyl mercapto hemi-ketal of dimethylalloxan.*—M. P. 85–86° C. This compound is prepared by allowing an excess of methyl mercaptan to react with dimethylalloxan dissolved in dry acetone. After removal of the solvent the crystalline residue is washed with dry ether and placed in a dessicator containing mercuric chloride. It regenerates methyl mercaptan upon addition of an aqueous buffer solution of about pH 5 and is useful in dry roasted beverage materials.

*Methyl mercapto hemi-acetal of penta-acetyl-aldehydogalactose.*—M. P. 110–112° C. This substance is prepared by allowing an excess of methyl mercaptan to react at a temperature below 0° C. with penta-acetyl-aldehydogalactose dissolved in dry benzene. After a period at room temperature, the solid reaction product is collected on a filter and washed with benzene and hexane and recrystallized from benzene. Like the preceding compound, it readily regenerates methyl mercaptan upon addition of a buffer solution of about pH 5 and is useful in similar applications.

The following illustrations exemplify functional derivatives involving hydroxyl and carboxyl groups which, while within the scope of the present invention and broadly claimed herein, are specifically claimed in my companion application Serial No. 288,229. As in the case of the preceding two groups of reactions, the flavor and aroma bearing constituent may provide either of the functional groups involved in the reactions, or both reactants may be flavor and aroma bearing, in which case they both will be protected and both will be regenerated. It further will be evident that whichever group is provided by the flavor and aroma bearing constituent, the reactant supplying the other group may be selected from a wide variety of substances.

Hydroxyl-carboxyl group reactions

*Phenylethyl-gluconate.*—M. P. 104–106° C. This substance is prepared by mixing 2 grams of glucono-lactone with 10 cc. of phenylethyl alcohol and introducing a small amount of dry hydrogen chloride. The mixture is heated until the lactone is completely dissolved, and after crystallization excess liquid is removed by pressing the product on a porous plate and by prolonged contact with ether. It regenerates phenylethyl alcohol slowly in acidulated gelatin desserts.

*Terpinyl-potassium-carbonate.*—Potassium terpineolate is prepared in the usual manner and at the end of the reaction the liquid is decanted from the excess metal and diluted with 1 part of dry toluene and 2 parts of dry ether. Dry carbon dioxide gas is then bubbled through the mixture until precipitation of the carbonate is complete, after which the product is collected on a filter, washed with ether, and dried in a vacuum. It regenerates a good terpineol flavor and aroma in acidulated gelatin desserts and is useful with distilled lime oil flavors.

*Menthyl-potassium-carbonate.*—This product is prepared by the technic described for the preceding compound and is useful in producing a minty flavor or cooling sensation.

*Acetylanhydrocitric acid.*—M. P. 125–127° C. This compound is prepared by the reaction of acetylchloride on dry citric acid and may be purified conveniently by recrystallization from dichlorethane. It, as well as its derivatives, acetylcitric acid and trisodium acetylcitrate, are useful in small quantities for imparting a tart note to certain fruit flavors.

*Propionylanhydrocitric acid.*—M. P. 134–138° C. This product is prepared like the preceding compound, with the substitution of propionylchloride for acetylchloride, and its uses, as well as those of its corresponding derivatives are analogous.

*Caproylanhydrocitric acid.*—M. P. 75–78° C. This products results from the reaction of caproylchloride on citric acid. If necessary, crystallization may be induced by washing with hexane. It is useful in applications similar to those described in connection with the two preceding compounds.

It will be understood that although the three groups of reactions described and illustrated above are of wide application and are desirable because of their convenience and suitability, other appropriate types of reactions may also be employed. Thus it may be desirable with some volatile oil constituents to use inorganic reactants, such as metals, which are compatible with the food to which they are added, as illustrated by the following examples:

*Sodium vanillinate.*—It is well known that because of its phenolic properties vanillin reacts with alkali hydroxides. The sodium salt of vanillin is a stable, crystalline, odorless solid from which vanillin is released by weak acids.

*Sodium methyl salicylate.*—This substance is preferably prepared by the union of the salicylate with sodium hydroxide in alcohol solution. In addition to being used for its wintergreen flavor, which is released by weak acids or merely the addition of water, it may also be used to shade other flavors.

*Sodium coumarinate.*—This compound is prepared by reacting coumarin with an equivalent quantity of concentrated sodium hydroxide solution. It is a crystalline, virtually inodorous solid which on contact with dilute acids liberates coumarinic acid which in turn reverts to coumarin. It is useful in imparting the characteristic aroma and flavor of coumarin to gelatin dessert preparations, roasted beverage materials, and the like.

It will be apparent that it is not essential to isolate the desired volatile oil constituents in pure form in order to produce functional derivatives thereof in accordance with the present invention, since in certain cases the same reactions and the same derivatives will be obtained regardless of whether an individual constituent is treated in isolated form or in the presence of other constituents of the volatile oil in which it occurs. It hence will be understood that the references herein and in the appended claims to the treatment of individual chemical constituents of volatile oils include the formation of reaction products not only by treatment of isolated constituents but also by selective reaction upon such constituents in the presence of other constituents of the oils containing them.

It further will be apparent from the foregoing description that the invention is applicable to a wide variety of aroma and flavor bearing constituents of volatile oils. While the specific reagents may vary with different constituents to be stabilized and with the food to be flavored, the reactions have in common the formation of a functional derivative of the flavor and aroma bearing constituent that is substantially non-volatile and non-oxidizable under conditions attending the marketing of the product, and which is dissociated under the conditions of ultimate use of the product. Thereby the flavor and aroma of the stabilized materials are imparted to the food in a nascent state with full freshness and intensity, at the instant of preparation or use and substantially regardless of the elapsed time since manufacture of the food. Not only is deterioration prevented and a full fresh flavor obtained, but also the invention makes unnecessary the use of excessive quantities of flavor materials heretofore sometimes added to allow for loss. Further since volatilization and oxidation cease to be a factor, cheaper packages may be used and less care in sealing required.

The foregoing illustrations are by way of example only and are not to be understood to comprise the limits of the invention. Other reagents and other stabilizing reactions will be apparent to those skilled in the art, in the cases both of the flavor and aroma bearing substances expressly referred to herein as well as others. Furthermore some variation in the reagents used is to be expected depending on the nature of the food to which the flavor is to be added. Thus a reagent, when regenerated, may have a taste which would be acceptable in one food but not in another. Also in a non-acid product, for example, the reaction should be such as to be reversible in the absence of acid. Moreover, in some cases a stable reaction product may be formed from two flavor bearing substances both of which are desirable in the product to be flavored, in which case the use of additional reagents may be avoided. These considerations which control the selection of the most suitable reagent for a particular flavor or aroma and food will readily be understood by those skilled in the art, in view of the above discussion of the principles involved. It will also be understood that any one or a plurality of these reaction products may be added to the same food, either comprising the entire flavor and aroma or a portion thereof or being used as a fortification of the natural flavor and aroma bearing substances. These various embodiments will be within the knowledge of those skilled in the art without departing from the spirit of the invention and reference should be had to the appended claims to determine its limits.

Although this invention is described in terms of constituents of the natural volatile oils and although it is practiced preferably by using natural materials, there is obviously little, if any, chemical difference in a given compound due to its origin, i. e., whether natural or artificial. Therefore, it is regarded as within the present invention to substitute an artificial flavor or aroma bearing compound for one of natural origin or to extend a given reaction to other compounds of the same class when the difference involved is essentially a question of the natural occurrence or artificial production of the aromatic compound to be protected.

Certain of the reactions and processes of preparation that are described above embody per se features of novelty that will be claimed in separate applications and hence are not claimed specifically herein.

What is claimed is:

1. The method of imparting flavor to a food product which comprises adding thereto a stable, substantially non-volatile, non-oxidizable functional derivative of a flavor or aroma bearing constituent of a volatile oil, which derivative is decomposed under conditions of ultimate use of the food to liberate said constituent and leave a residue which is compatible with the flavor and aroma of the food.

2. The method of imparting flavor and aroma to a food product which comprises adding thereto a stable, substantially non-volatile, non-oxidizable functional derivative of a flavor and aroma bearing constituent of a volatile oil, which derivative is hydrolyzed under conditions of ultimate use of the food to liberate said constituent and leave a residue which is compatible with the flavor and aroma of the food.

3. A process of imparting flavor and aroma to a food product at the time of use which comprises adding thereto during its manufacture a stable, substantially non-volatile, non-oxidizable functional derivative formed by the chemical interaction of the functional groups of two reactants compatible with the food, at least one of which is a flavor and aroma bearing volatile oil constituent, the chemical reaction between said groups being reversible under conditions of ultimate use of the food to liberate said two reactants.

4. A process of imparting flavor and aroma to a food product at the time of use which comprises adding thereto during its manufacture a stable, substantially non-volatile, non-oxidizable functional derivative formed by chemical interaction of a carbonyl group of one reactant and an amine group of another reactant, said reactants being compatible with the food and at least one being a flavor and aroma bearing volatile oil constituent, the chemical reaction between said groups being reversible under conditions of ultimate use of the food to liberate said two reactants.

5. The method of imparting flavor to a food product which comprises adding thereto a stable, substantially non-volatile and non-oxidizable functional derivative of a flavor or aroma bearing constituent of a volatile oil having a carbonyl group formed by chemical interaction and with an acid amide compatible with the food, said derivative being hydrolyzed under conditions of ultimate use of the food to liberate said constituent.

6. The method of imparting flavor to a food product which comprises adding thereto a stable, substantially non-volatile and non-oxidizable functional derivative of a flavor or aroma bearing constituent of a volatile oil having a carbonyl group formed by chemical interaction and with an amino alcohol compatible with the food, said derivative being hydrolyzed under conditions of ultimate use of the food to liberate said constituent.

7. The method of imparting flavor to a food product which comprises adding thereto a stable, substantially non-volatile and non-oxidizable functional derivative of a flavor or aroma bearing constituent of a volatile oil having a carbonyl group formed by chemical interaction and with an amino acid compatible with the food, said derivative being hydrolyzed under conditions of ultimate use of the food to liberate said constituent.

8. A method of imparting flavor and aroma to a food product which comprises adding thereto a stable, substantially non-volatile, non-oxidizable compound capable of decomposing under the conditions of ultimate use of the food to yield said flavor and a residue compatible therewith, said compound being formed by the reaction $C=O + H_2N$, wherein the $C=O$ group is supplied by a flavor and aroma bearing constituent of a volatile oil and the $H_2N$ group is supplied by a reagent of the group consisting of acid amides, amido esters, amino acids, amino acid esters and amino alcohols which is edible and compatible with the flavor and aroma of the food.

9. A method of imparting flavor to a food product which comprises adding thereto a stable, substantially non-volatile, non-oxidizable compound capable of decomposing under the conditions of ultimate use of the food to yield said flavor, said compound being formed by reaction of the C=O group of a flavor and aroma bearing volatile oil constituent with the $NH_2$ group of a reagent selected from the group consisting of urea, thiourea and methylurea.

10. A method of imparting flavor to a food product which comprises adding thereto a stable, substantially non-volatile, non-oxidizable compound capable of decomposing under the conditions of ultimate use of the food to yield said flavor, said compound being formed by reaction of ethyl carbamate with an aldehyde which is a flavor and aroma bearing constituent of a volatile oil.

11. A method of imparting flavor to a food product which comprises adding thereto a stable, substantially non-volatile, non-oxidizable compound capable of decomposing under the conditions of ultimate use of the food to yield said flavor, said compound being formed by reaction of an amino acid with an aldehyde which is a flavor and aroma bearing constituent of a volatile oil.

12. A method of imparting flavor to a food product which comprises adding thereto a stable, substantially non-volatile, non-oxidizable compound capable of decomposing under the conditions of ultimate use of the food to yield said flavor, said compound being formed by reaction of thiourea with diacetyl.

13. A foodstuff having at the time of consumption the characteristic aroma and flavor of a constituent of a volatile oil, said flavor and aroma being embodied in a stable, substantially non-volatile, non-oxidizable functional derivative of said constituent and a reactant compatible with said flavor and aroma, which derivative decomposes under conditions of ultimate use to liberate said constituent.

14. A foodstuff having at the time of consumption the characteristic raoma and flavor of a constituent of a volatile oil, said flavor and aroma being embodied in a stable, substantially non-volatile, non-oxidizable functional derivative formed by the chemical interaction of a carbonyl group of one reactant with an amine group of another reactant, one of said reactants comprising said constituent and the other being compatible with said flavor and aroma, said reaction being reversible under conditions of ultimate use to liberate said two reactants.

15. A foodstuff having at the time of consumption the characteristic aroma and flavor of a constituent of a volatile oil, said flavor and aroma being embodied in a stable, substantially non-volatile, non-oxidizable functional derivative formed by chemical interaction of the carbonyl group of said constituent with an amino acid compatible with said flavor and aroma, which derivative is hydrolyzable under conditions of ultimate use to liberate said constituent.

16. A foodstuff having at the time of consumption the characteristic aroma and flavor of a constituent of a volatile oil, said flavor and aroma being embodied in a stable, substantially non-volatile, non-oxidizable functional derivative formed by chemical interaction of the carbonyl group of said constituent with an acid amide compatible with said flavor and aroma, which derivative is hydrolyzable under conditions of ultimate use to liberate said constituent.

17. A foodstuff having at the time of consumption the characteristic aroma and flavor of a constituent of a volatile oil, said flavor and aroma being embodied in a stable, substantially non-volatile, non-oxidizable function derivative formed by chemical interaction of the carbonyl group of said constituent with an amino alcohol compatible with said flavor and aroma, which derivative is hydrolyzable under conditions of ultimate use to liberate said constituents.

ROLAND E. KREMERS.